United States Patent [19]

Jeon

[11] Patent Number: 5,544,562
[45] Date of Patent: Aug. 13, 1996

[54] APPARATUS OF A PLAYING PRACTICE FOR ELECTRONIC MUSICAL INSTRUMENT AND CONTROL METHOD THEREOF

[75] Inventor: Ik B. Jeon, Seoul, Rep. of Korea

[73] Assignee: Goldstar Co., Ltd., Rep. of Korea

[21] Appl. No.: 271,787

[22] Filed: Jul. 7, 1994

[30] Foreign Application Priority Data

Jul. 8, 1993 [KR] Rep. of Korea ............... 12845/1993
Aug. 17, 1993 [KR] Rep. of Korea ............... 15886/1993

[51] Int. Cl.⁶ ............................................. G09B 15/00
[52] U.S. Cl. ........................... 84/470 R; 84/478; 434/227
[58] Field of Search ..................... 84/470 R, 477 R, 84/478; 434/227

[56] References Cited

U.S. PATENT DOCUMENTS 4,230,012  10/1980  Bommersbach et al. ............. 84/470 R
4,254,686  3/1981   Leonard ............................... 84/481
4,331,062  5/1982   Rogers ................................. 84/478
4,344,344  8/1982   Nakada et al. ....................... 84/478
5,183,398  2/1993   Monte et al. ......................... 434/227

FOREIGN PATENT DOCUMENTS 92-7815  6/1992  Rep. of Korea .

*Primary Examiner*—Patrick J. Stanzione
*Attorney, Agent, or Firm*—Ostrolenk, Faber, Gerb & Soffen, LLP

[57] ABSTRACT

An apparatus and method for practicing playing an electronic musical instrument which includes a select section for selecting a music teacher mode, a display section for displaying a score and key, a microcomputer for controlling an entire musical system and an output section for outputting audible sound. The apparatus is effective for displaying a mark indicating a key corresponding to a note of the score. Thus, the user can effectively and correctly practice playing an electronic musical instrument.

11 Claims, 8 Drawing Sheets

FIG.3
|  | MUSIC TEACHER |
|---|---|
| SW5 | 1.TEST : NOTES |
| SW6 | 2.TEST : MELODY |
| SW3 | 3.LEVEL : BEGINNER |
| SW4 | 4.SONG : MERRILY WE CAN |
| SW7 | CHORD TEACHER |
| SW2 | SONG START |
FIG.4
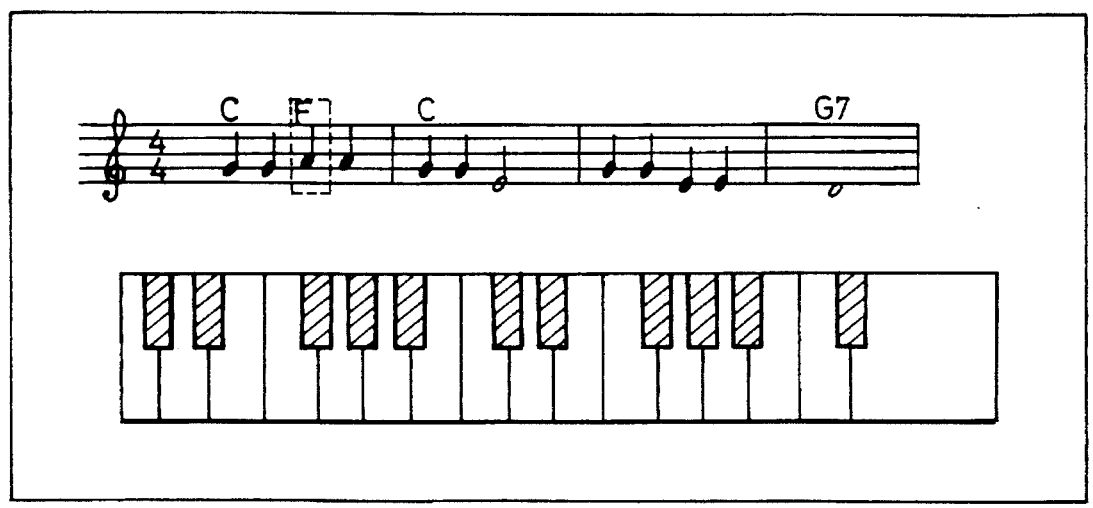
FIG.7
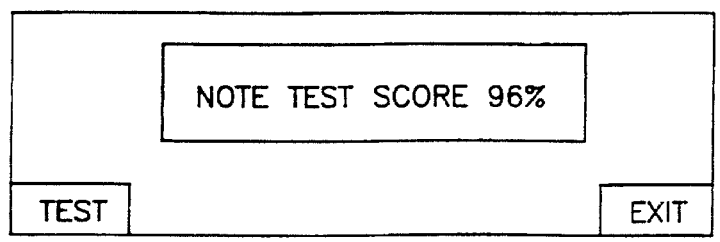

APPARATUS OF A PLAYING PRACTICE FOR ELECTRONIC MUSICAL INSTRUMENT AND CONTROL METHOD THEREOF

BACKGROUND OF THE INVENTION

1. Field of the Invention

The present invention relates to an electronic musical instrument, and in particular to apparatus and method for displaying a score being currently played and a keyboard corresponding to a note of the score on a liquid crystal display device(LCD), so as to enable a user to more easily and correctly practice the electronic musical instrument.

2. Description of the Prior Art

Conventionally, the playing practice apparatus of an electronic musical instrument, as shown in FIG. 1, includes a keyboard 1 having a plurality of light emitting diodes L1 to L17 corresponding to each of a plurality of keys of a keyboard, a select section 2 for selecting an automatic playing mode and a music thereof, a microcomputer 3 for controlling both an on and off of the light emitting diodes L1 to L17 according to an output signal of the select section 2 and an output section 4 according to a pushed key of the keyboard 1, and an output section 4 for outputting a desired tone to a speaker 5 according to the control signal of the microcomputer 3.

The output section 4 includes a tone generating section 41 for generating a desired tone according to the control signal of the microcomputer 3, a filter 42 for filtering predetermined signals from output signals of the tone generating section 41, a preamplifier 43 for amplifying an output signal of the filter 42, and a power amplifier 44 for amplifying the output signals of the amplifier to a predetermined level enough for driving the speaker 5.

The select section 2 includes a switch SW11 for selecting an automatic playing mode, switches SW12 and SW13 for selecting a music to be automatically played, and light emitting diodes L18 and L19 for indicating corresponding switches SW12 and SW13.

The operation of the conventional electronic musical instrument will be described.

First, when the power is supplied to a playing practice apparatus of the electronic musical instrument, a light emitting diode L18 of the select section 2 is turned on.

Under the state, when the switch SW11 is an off-state so that an automatic playing mode is not selected, the microcomputer 3 recognizes a key directly pushed by the user, and controls the tone generating section 41 of the output section 4 so that a desired tone corresponding to a recognized key can be produced.

Accordingly, the tone generating section 41 generates a signal corresponding to a pushed key and outputs the signal to the filter 42.

The output signal of the tone generating section 41, whose predetermined signals are filtered by the filter 42, is amplified by the preamplifier 43 to a predetermined level and amplified again by the power amplifier 44 to a predetermined level enough to drive the speaker 5.

Meanwhile, when the automatic playing mode is selected with the turned-on switch SW11, the light emitting diode L18 keeps a turned-on state.

Under these states, in case the switch SW12 is turned on, the microcomputer 3 recognizes that the switches SW11 and SW12 are turned on, reads data of the first music among automatic playing music previously stored in a memory of the microcomputer 3, and controls the light emitting diodes of keys corresponding to entire notes to be automatically played.

Described in detail, the microcomputer 3 causes the light emitting diodes mating to the note to be played for a predetermined time corresponding to a length of the note.

For example, when the pitch and length of a note are Sol and quarter note, a light emitting diode L8 mating to a key of Sol is turned on for a predetermined time corresponding to the quarter note. An then, seeing the light emitting diode L8 in turned-on state and a user pushes a key of Sol, the microcomputer 3 recognizes that the key of Sol is pushed, and controls the tone generating section 41 of the output section 4. When the user pushes another keys rather than Sol, the microcomputer 3 recognizes that the key of Sol is not pushed and controls the tone generating section 41 not to make any tone.

Accordingly, the user can exactly push the key of Sol corresponding to the light emitting diode L8 in an on-state.

Consequently, the microcomputer 3 enables a next light emitting diode, corresponding to the pitch and length of the next note to be played, to be lighted for a predetermined time corresponding to the pitch and length thereof.

When the first practice of the music is finished, when the switch SW11 is not turned off, the first practice music is repeatedly played.

Meanwhile, in case the switches SW11 and SW13 are turned on, the microcomputer 3 recognize that the switches SW11 and SW13 are turned on, take the data of the second music among the music stored at the memory of the microcomputer 3, and then repeatedly perform the procedure same to the first music.

Accordingly, in the conventional playing practice apparatus of the electronic musical instrument, there have been problems in playing rhythm, note, and chord, as seeing the score, because no score displaying means is provided.

SUMMARY OF THE INVENTION

Accordingly, it is an object of the present invention to provide an apparatus of displaying a score of the music to be played and a location of the key, which is corresponding to the note of the score to be played, so that the user can more easily and correctly play the electronic musical instrument.

To achieve the above object, the apparatus of a plurality practice for an electronic musical instrument according to the present invention includes a keyboard section including a plurality of keys, a select section for selecting a music teacher mode and a plurality of practice menus therein, a microcomputer for controlling both a display section and an output section according to the select section and an output section according to a pushed key of the keyboard, a display section for displaying a predetermined display according to a control signal of the microcomputer, and an output section for outputting an audible sound according to a control signal of the microcomputer.

BRIEF DESCRIPTION OF THE DRAWINGS

The objects and features of the invention may be understood with reference to the following detailed description of an illustrative embodiment of the invention, taken together with the accompanying drawings in which:

FIG. 3 is a view showing a music teacher menu displayed on the screen of the playing practice apparatus of the electronic musical instrument;

FIG. 4 is a view showing a note test of the first test in the music teacher menu of FIG. 3;

FIG. 7 is a view showing a note test performance in the music teacher menu of FIG. 3;

DESCRIPTION OF THE PREFERRED EMBODIMENTS

Figure 1:
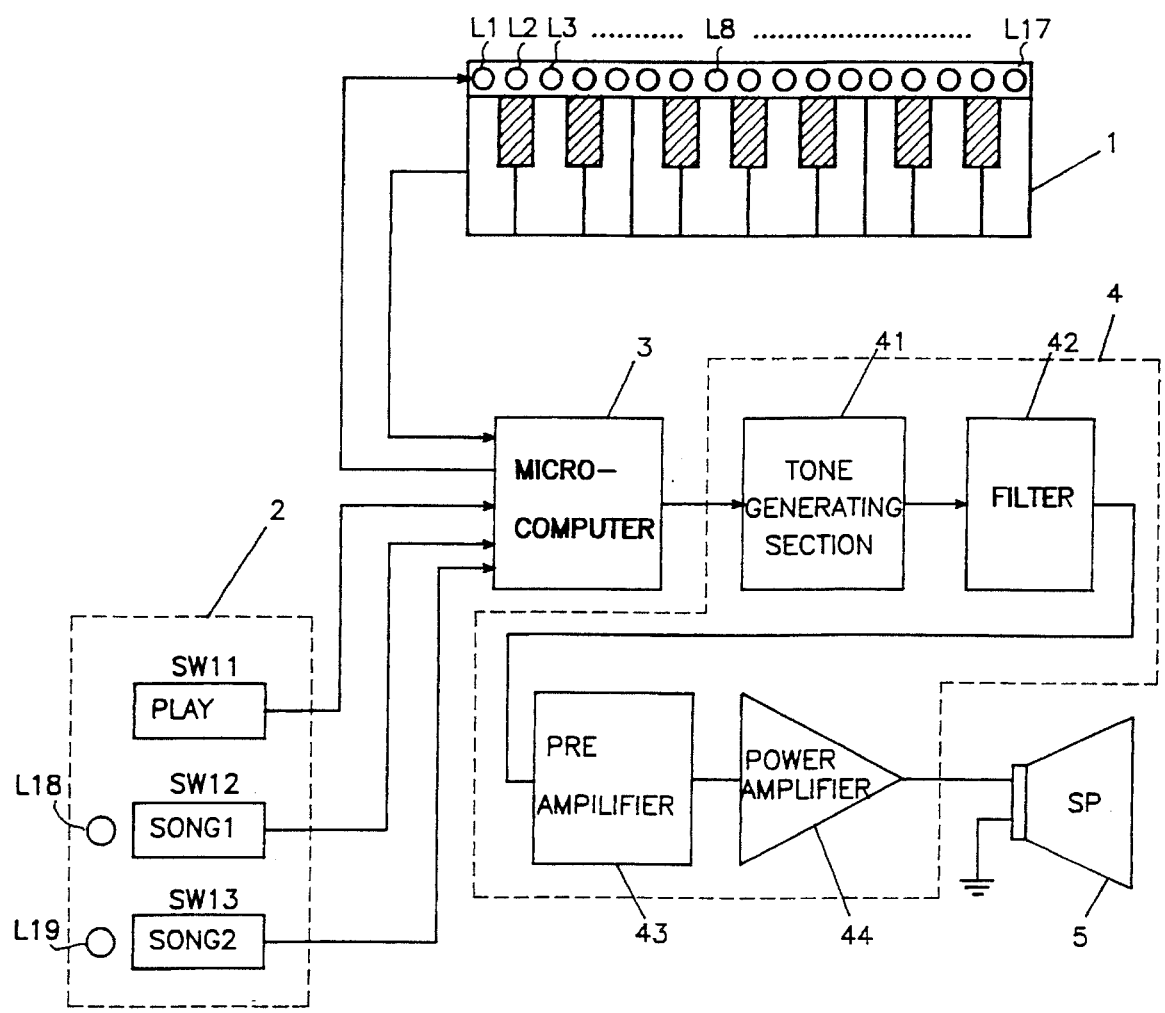
FIG. 1 is a block diagram showing a conventional playing practice apparatus of the electronic musical instrument.
Figure 2:
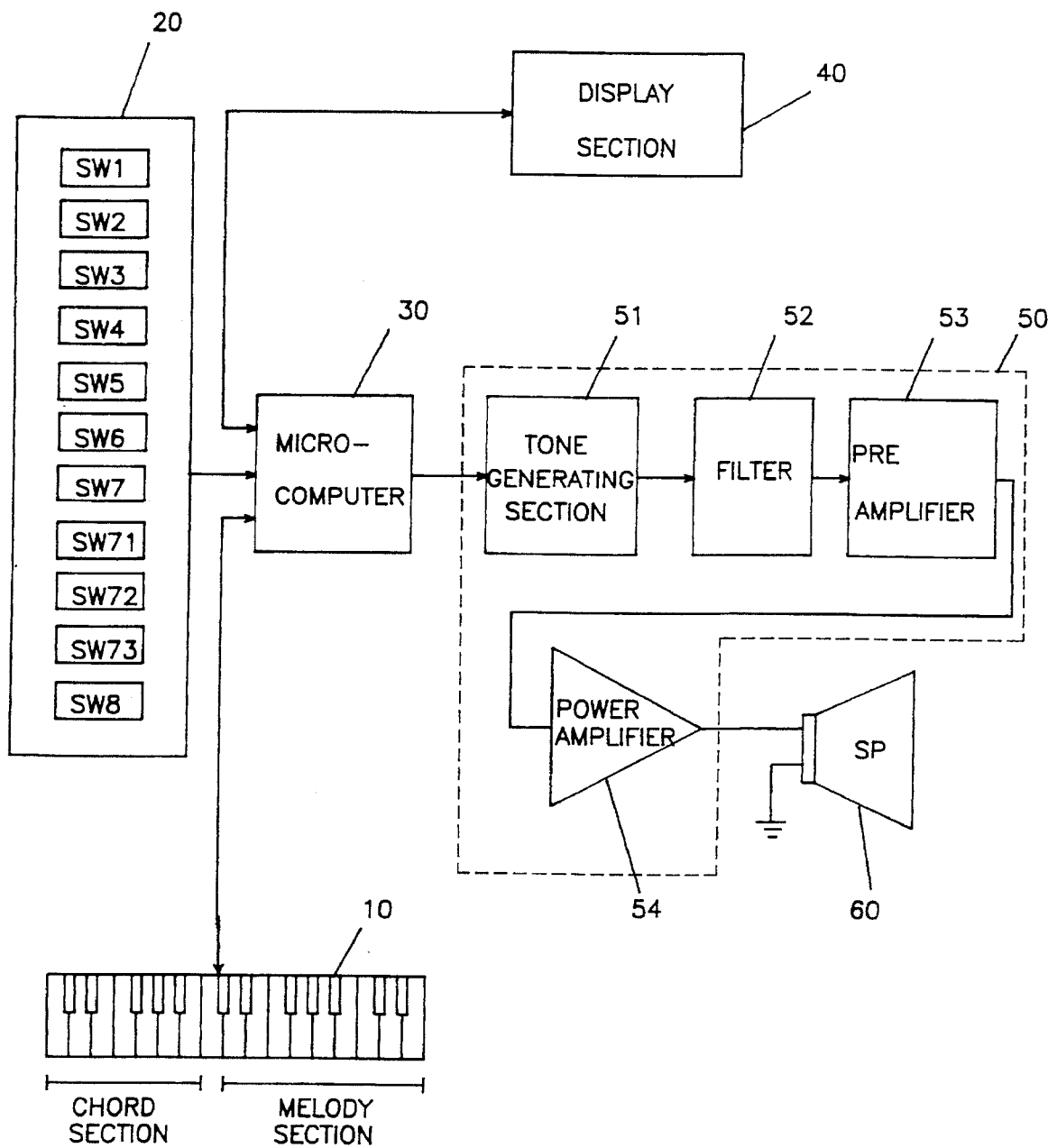
FIG. 2 is a block diagram showing a playing practice apparatus of the electronic musical instrument according to the present invention.

Referring to FIG. 2, a playing practice apparatus of an electronic musical instrument according to the present invention includes a keyboard 10 having a plurality of keys, a selection section 20 for selecting a teacher mode and a practice menu in the music teacher mode, a microcomputer 30 for controlling both a display section 40 according to the output signal of the select section 20 and an output section 50 according to a pushed key of the keyboard 10, a display section 40 for displaying data on the screen according to the control signal of the microcomputer 30, and an output section 50 for outputting the tone to the speaker 60 according to the control signal of the microcomputer 30.

The select section 20 includes a switch SW1 for selecting a music teacher mode, a switch SW2 for selecting a start/stop functions, and switches SW3 to SW8 for selecting a practice menu in the music teacher mode.

The output section 50 is the same to the output section 4 of the conventional playing practice apparatus of the electronic musical instrument.

The operation of the playing practice apparatus of the electronic musical instrument according to the present invention will be described.

First, in a state the power is supplied to the playing practice apparatus of the electronic musical instrument, when the switch SW1 of the select section 20 is turned on and then the music teacher mode is selected, a menu of the music teacher mode, as shown in FIG. 3, is displayed on the display section 40.

In the state described above, as for the level of the playing music, when the switch SW3 of the switch section 20 is pushed once, a medium mode is displayed, and when pushing again once, an advanced mode is displaying and when pushing again once, a beginner mode is selected.

Whenever the switch SW4 of the switch section 20 is pushed, the music name mating to the corresponding music level is displayed.

In addition, in a first test, whenever the switch SW5 of the select section 20 is pushed, the note, rhythm, and note+rhythm is displayed in order.

In a second test, the switch SW6 of the switch section 20 is pushed, the melody, chord, melody+chord is displayed in order.

Figure 5:
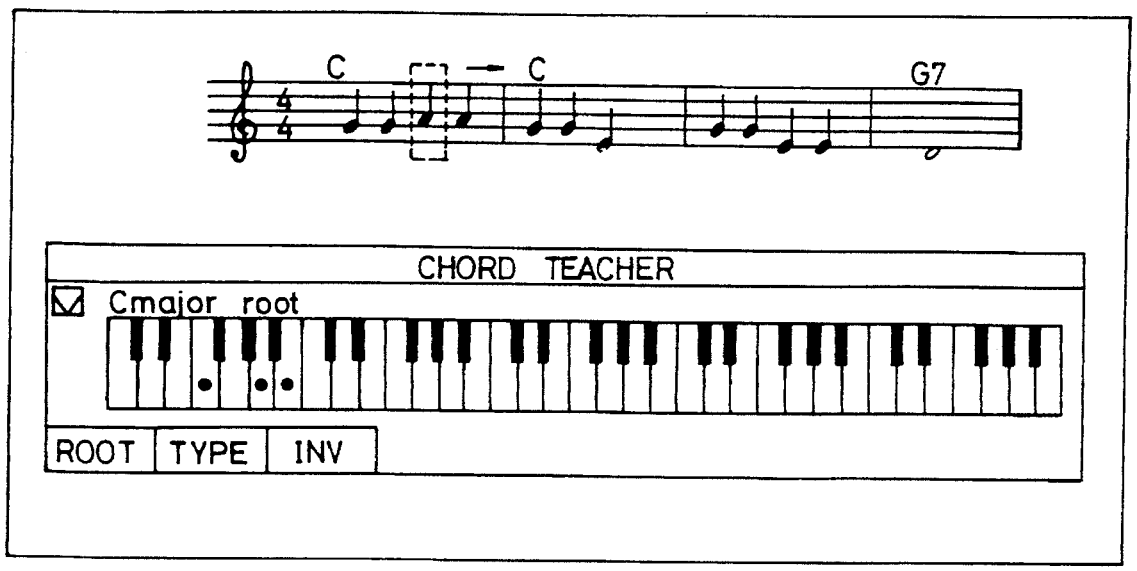
FIG. 5 is a view showing a chord test of the second test in the music teacher menu of FIG. 3.

When a chord teacher mode is selected with a turned-on of the switch SW7 of the switch section 20, a chord teacher menu, as shown in FIG. 5, is displayed on the screen.

In the state described above, whenever the switch SW72 is pushed, the major or minor chord type previously memorized is displayed on the screen in order.

In addition, whenever the switch SW73 is pushed, in the inversion(INV) the root and a mark corresponding to a first and second inversion is displayed on the screen.

Referring to FIG. 8 to FIG. 11, the control method of the playing practice apparatus of the electronic musical instrument according to the present invention will be explained.

First, the microcomputer 30 judges whether or not the signal of the switch SW1, which is inputted according to the operation of the switch SW1 of the select section 20, is for performing the music teacher mode.

Thus, when the switch SW1 is turned off, the microcomputer 30 judges that the signal for performing the music teacher mode is not inputted.

When the microcomputer 30 judges that a key of the keyboard 20 is pushed, the microcomputer 30 outputs a control signal, to the output section 50, for generating a tone corresponding to a key pushed, and the microcomputer 30 judges that any key is not pushed, the microcomputer outputs a control signal for not generating a tone to the output section 50.

After that, when the microcomputer 30 judges that a key is released, the microcomputer 30 outputs a control signal to the output section 50 in order to turn off the gate and then goes back to the initial state, but when the microcomputer 30 judges that a key is not released, the microcomputer 30 goes back to the initial state without a process of turning off the gate.

Meanwhile, when the switch SW1 is turned on, the microcomputer 30 judges that a signal for performing the music teacher mode is inputted and then, as shown in FIG. 3, causes a menu of the music teacher mode to be displayed on the display section 40.

Accordingly, seeing the menu of the music teacher displayed on the screen, the user can select a desired key of the select section 20 for selecting the first and second test and the level and name of the music.

After that, the microcomputer 30 is supplied with a signal according to the operation of the switch SW8 of the select section 20 and then judges whether or not the signal is for performing the practice mode performing the music teacher mode of the predetermined music.

At this time, when the switch SW8 of the switch section 20 is not operated in a turned-on state, the microcomputer 30 judges that a signal for performing the practice mode is not inputted and then enter a process, which is performed just after judging that the music teacher mode is not provided, of judging whether or not a pushed key is present.

Figure 9:
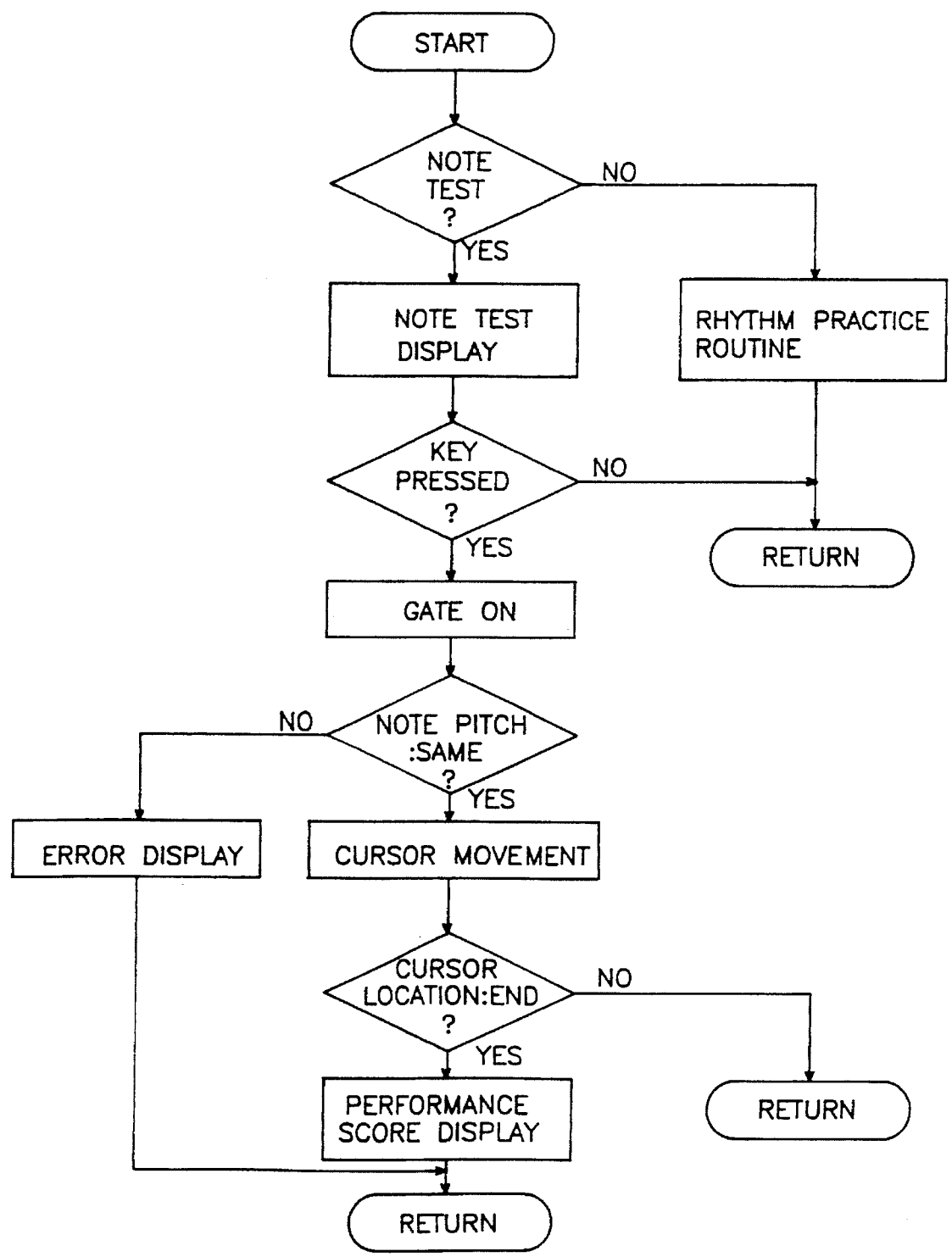
FIG. 9 is a flow chart showing a sub-routine of the music teacher of the flow chart of FIG. 8.

However, when the switch SW8 of the select section 20 is turned on, the microcomputer 30 judges that a signal for performing the practice mode and then, as shown in FIG. 9, performs the music teacher routine.

The description of the music teacher routine will be explained, in detail.

First, the microcomputer 30 judges that the selected menu of the first test of FIG. 3 is a note, and as shown in FIG. 4, a note test with score and keys is displayed on the display section 40.

Meanwhile, in the music teacher mode, the menu of the first and second test is set in note and melody, it is available to practice only the pitch of tone of the predetermined music.

At this time, a tetragonal cursor indicated in dotted line in the score of the note test display is placed on the note to be played, a black mark on the key of the keyboard in the note test means a key to be played.

In the state above described, the microcomputer 30 judges whether or not a predetermined key among keys of the keyboard 10 is newly pushed.

At this time, when a key indicated by the cursor is not pushed or the other key is pushed, the microcomputer 30 returns, maintaining the cursor not to move from the current note to the next note.

However, when a key corresponding to the note marked by the cursor is pushed, the microcomputer 30 causes a tone, corresponding to a note currently marked by the cursor, of the key to be generated by means of controlling the output section 50, and then the cursor moves from the current note to the next note. When it is judged that a pitch of note currently marked and a pitch of a key pushed are not identical each other, the errors are incremented and then displayed on the screen, so that the microcomputer 30 returns and judges whether or not the cursor is placed at the last point of the score. At this time, when it is judged that the cursor is not placed at the last point thereof, the microcomputer 30 return to the initial state, but when it is judged that the cursor is placed on the last point thereof, as shown in FIG. 7, the microcomputer 30 returns after causing the test performance scores to be displayed on the display section 40.

Meanwhile, when the switch SW5 is pushed in a state as shown in FIG. 7, the note test shown in FIG. 4 is displayed again. When the switch SW1 is pushed, the music teacher mode as shown in FIG. 3 is displayed on the screen.

Figure 10:
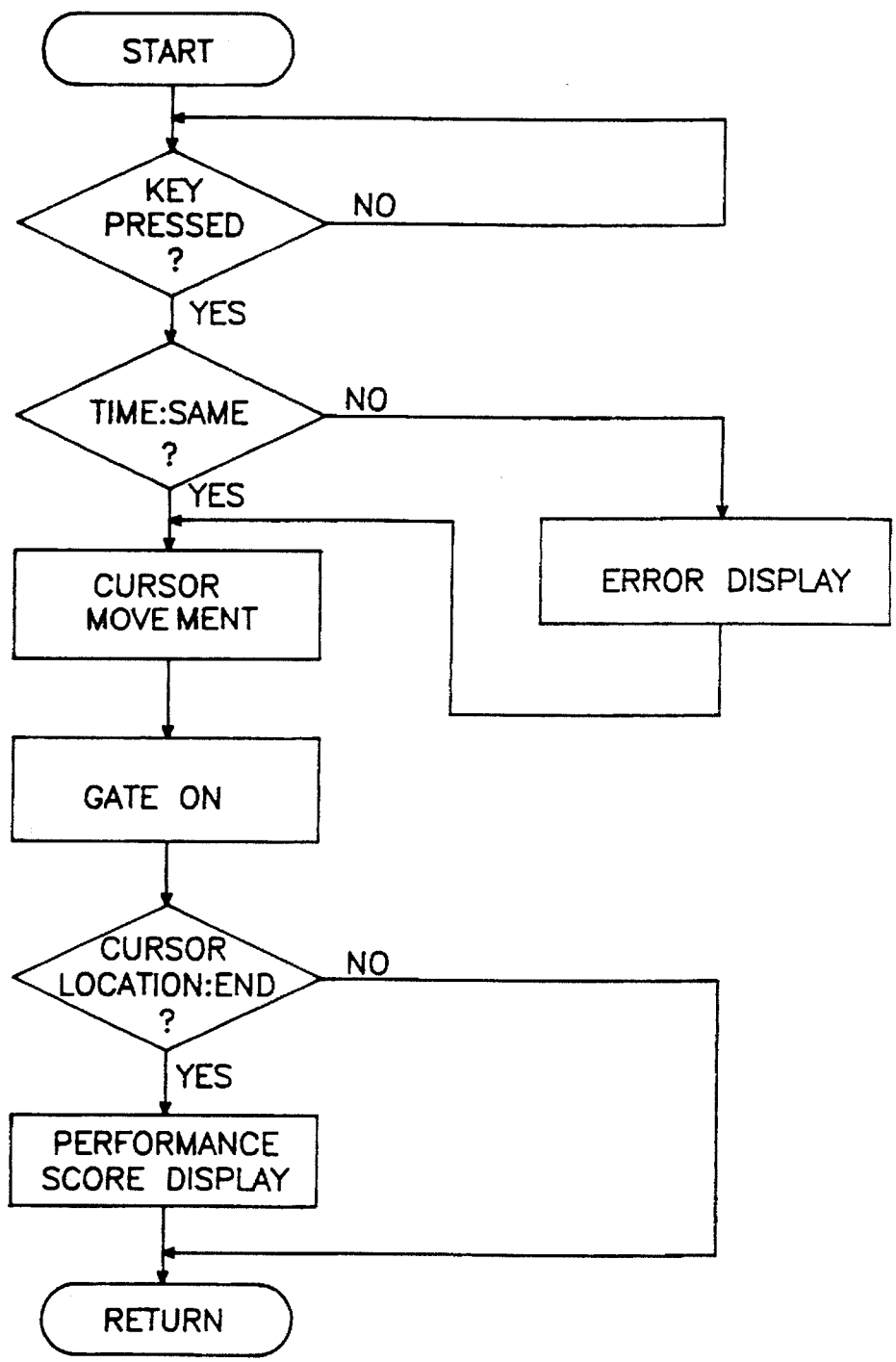
FIG. 10 is a flow chart showing a sub-routine of the rhythm practice of the flow chart of FIG. 8.

But, in a state that the music teacher mode as shown in FIG. 4 is displayed, the switch SW5 is pushed again, the rhythm test routine as shown in FIG. 10 is performed.

The rhythm test is explained more in detail.

Referring to FIG. 4, the predetermined accompaniment music is automatically played as a background music and then the user can practice the playing to the rhythm of the melody.

After that, the microcomputer 30 judges whether or not a predetermined key among keys of the keyboard is newly pushed.

At this time, when judged there is not a key newly pushed, the microcomputer 30 continuously checks whether or not there is a key newly pushed. When there is a key newly pushed, the cursor stays at the current location for a time corresponding to the length of the note. After lapsed a time corresponding to the length of the note, the tone is outputted based on the key with the cursor and then moves to the next location of the note, even though the pushed key is different from the key corresponding to the note indicated by the cursor.

But, the outputting tone is the tone indicated by the cursor, not the tone corresponding to the key actually pushed by the user.

Figure 11:
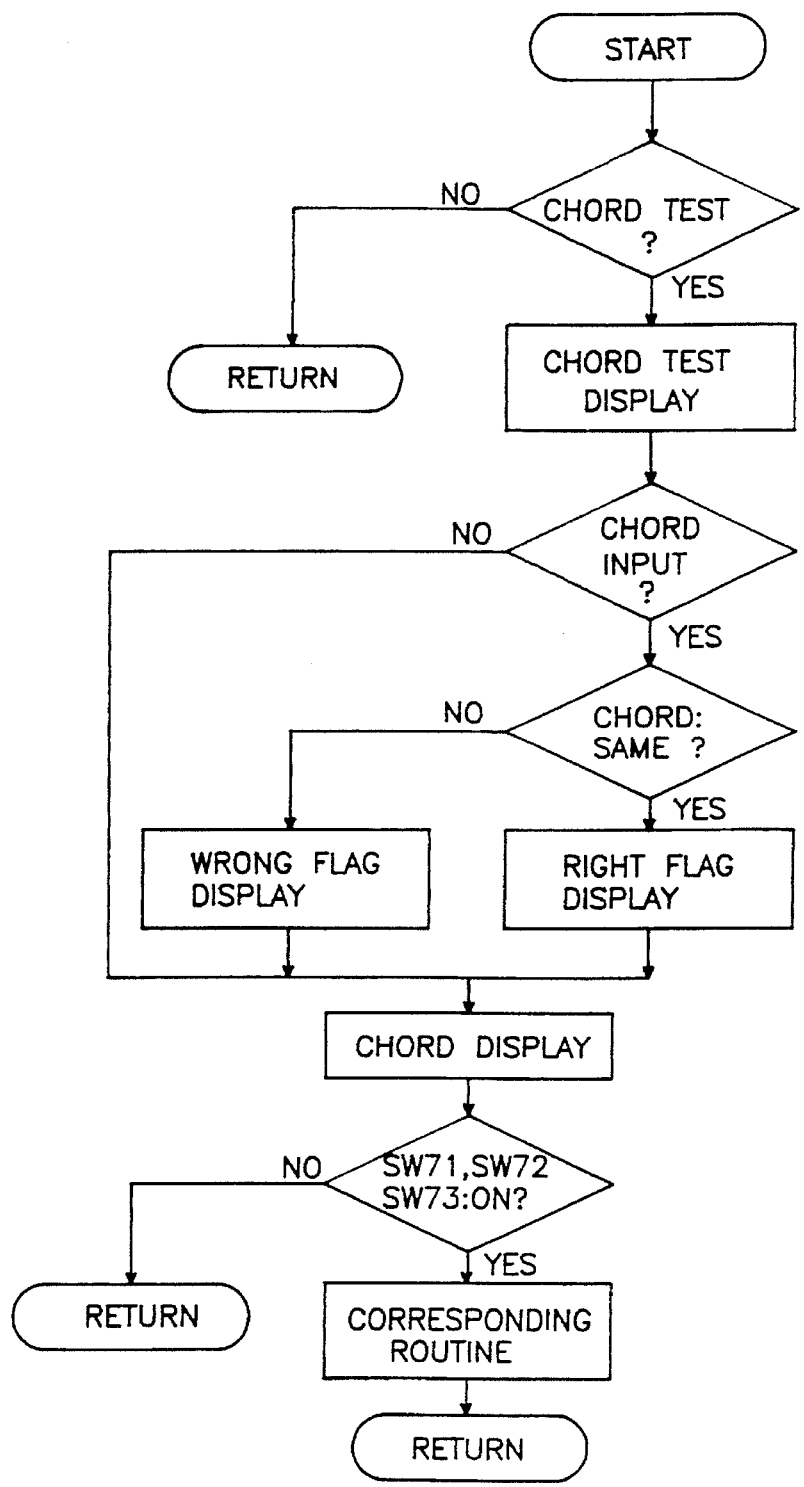
FIG. 11 is a flow chart showing a sub-routine of the chord practice of flow chart of FIG. 8.

Meanwhile, the microcomputer 30 checks a difference between a turning-on time of the note indicated by the cursor and a turning-on time of the key actually pushed by the user, compares a checked time interval with a previously set up time interval, and then causes some changes to a tempo of the music which is automatically played to a predetermined speed by the user. Thus, when the checked time interval is greater than that of the predetermined time interval, the tempo of music automatically played becomes slower, and when the checked time interval is smaller than that of the predetermined time interval, the tempo of music automatically played becomes faster. In a state that the menu of the music teacher mode as shown in FIG. 3 is displayed, when the switch 7 is pressed, the chord teacher routine is performed as shown in FIG. 11.

For more in detail explaining the description, first, when the microcomputer 30 judges that a menu of the first and second test is a not and chord, the microcomputer 30 outputs the control signal to the display section 40 and causes the menu of chord test to be displayed on the screen as shown in FIG. 5.

A tetragonal cursor shown dotted line in the score of the chord test indicates a note to be played, and on the key of the test display, a black mark indicates a chord corresponding to the note to be played.

The microcomputer initialize a chord root value, a chord type value and a chord inversion value to be zero, displays a defaulted chord root value, chord type value, chord inversion value, for example, C-major, root on the display section and then causes the flag to be on-state, which indicates that the current chord test mode is currently performed.

After that, when the microcomputer 16 judges the key information inputted according to the pushed key of the chord section of the keyboard 10, the microcomputer 16 judges whether or not the chord information displayed on the display section 40 is identical with the chord information inputted through the keyboard section 11.

At this time, when the microcomputer 16 judges that the information inputted through the keyboard section 10 is identical to the default information, the signs such as "V" or "O", as shown in FIG. 5, are displayed on the display section 40 and then a chord name of C-major and the root of a currently selected inversion root are displayed on the display section 40.

Meanwhile, the microcomputer 16 judges that the information inputted from through the keyboard section 10 is not identical to the information displayed on the display section 40, the sign such as "X" is displayed on the display section 40, and then the name of chord and the currently selected inversion root are displayed on the display section 40.

After the microcomputer 30 performs the input chord process, the microcomputer 30 checks a switch 71 for selecting a chord root, a switch 72 for selecting a chord type, and a switch 73 for selecting a chord inversion and then performs a sub-routine corresponding to the switch selected by the user.

For more in detail explaining the description, when it is judged that the switch 71 for selecting the chord root is turned on, after the chord root value is compared with a predetermined value, for example 1, which is incremented, the incremented chord root value is compared with 12.

At this time, the chord root value is displayed as a note and means a pitch of the chord. For example, the chord root values of C, C#, D, D#, E, F, F#, G, G#, A, A#, B in an octave is given with the values of 0, 1, 2, 3, 4, 5, 6, 7, 8, 9, 10, 11, respectively.

Each of chord root values is compared with the values of octave of 12 because there are 12 notes in an octave. After the comparison, when it exceeds the octave value of 12, thus, each of chord root values are above the value of 12, the chord root value decrements by the value of 12, so that the chord name and mark is changed when each of values of the chord root is less than the value of 12, thus, each of the chord root value is zero to eleven, the chord name and mark are changed without changes of the value of the octave.

By the process describe above, after the chord root display is changed as shown in FIG. 5, it is returned to the main routine.

Meanwhile, when the switch SW72 for selecting the chord type is turned on, the microcomputer 30 causes the chord type value stored in the memory of the microcomputer 30 to be increased and compares both a final chord number of the chord table and the inputted chord type value, each other, when it is judged that the chord type value is one in the chord table, the microcomputer 30 causes the selected practice mode to be displayed on the display section 40. When it is judged that the chord type value is not one in the chord table, the microcomputer 30 decrease the chord type value by 1 and displays the selected practice mode on the display section 40.

At this time, the chord type means the feature of its chord. When the chord types are different each other even though it is the same chord root, the notes consisting of the chord is different. For example, in the chord type table consisting of the ten chord types, the chord type value of C-major is zero. When the switch 72 is turned on in a state of C-major, the chord type value is 1. The C-minor corresponding to the chord type value of 1 is displayed on the screen of the display section 40, at the same time, the mark indicated on the key of the display section 40 indicates the mark corresponding to the C-minor.

When it is judged that the switch 73 for selecting the chord inversion is turned on, the microcomputer 30 causes the chord inversion value to be increased by 1 and compares the increased value with the difference reference value of 3 of the chord inversion. When it is judged that it is more than the difference reference value, the microcomputer 30 causes the chord inversion value to be decreased by 1, and the chord name corresponding to the inverted chord location and the currently selected practice mode are displayed on the display section 40. When it is judged that it is less than the difference reference value, the chord name corresponding to the chord location of the inverted difference and the currently selected practice mode are displayed on the display section 40.

Figure 6:
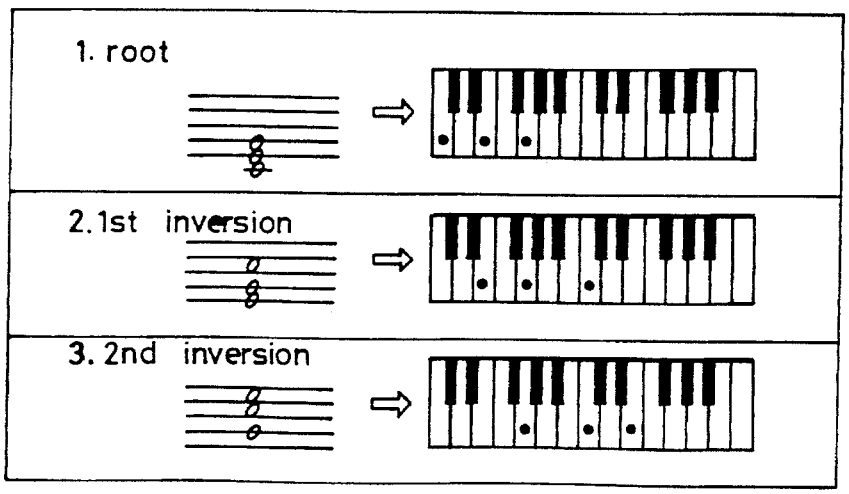
FIG. 6 is a view showing an inversion of the chord test of FIG. 5.
Figure 8:
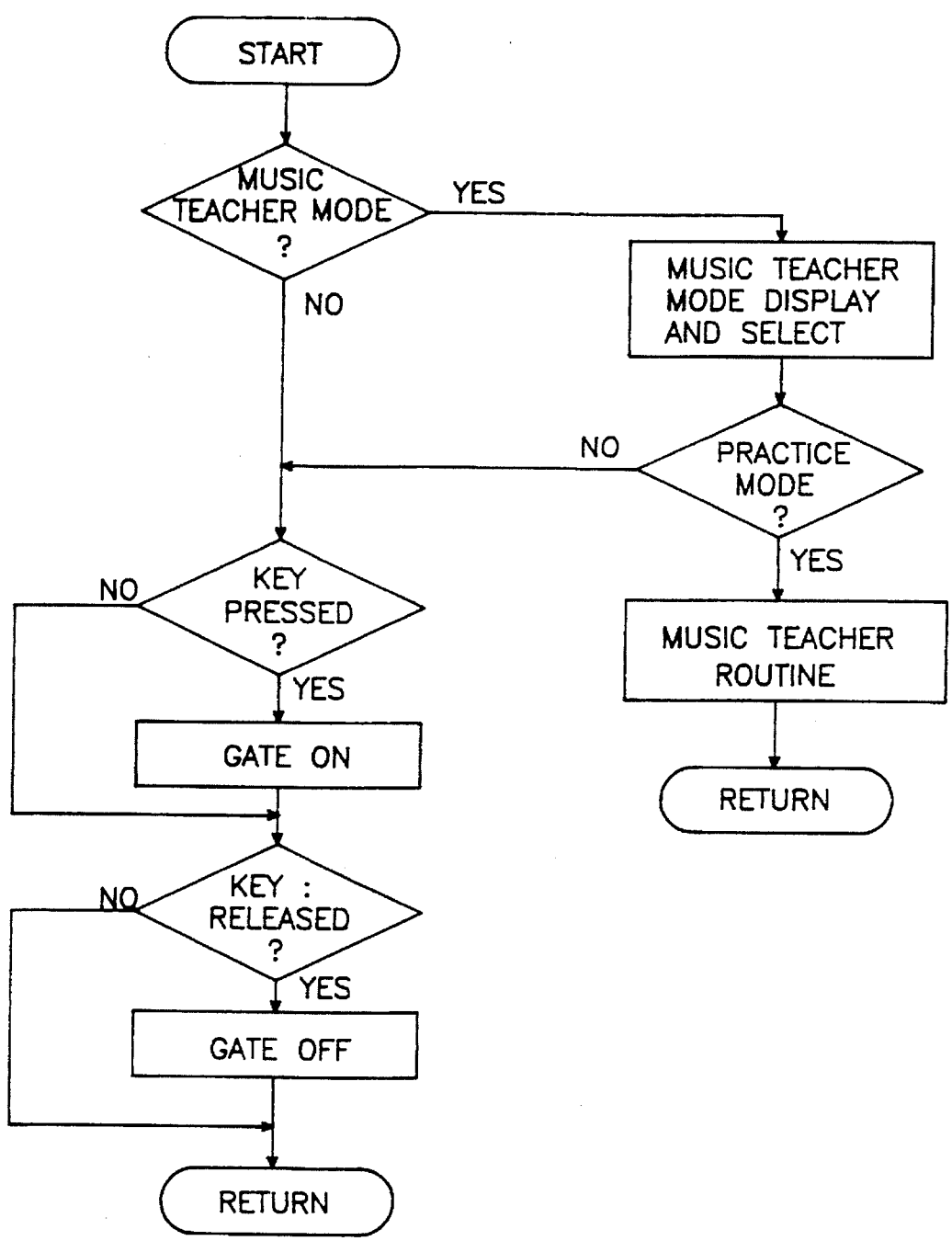
FIG. 8 is a flow chart showing a control method of the playing practice apparatus of the electronic musical instrument according to the present invention.

Referring to FIG. 6, in case the chord inversion does not occur with a root of C-chord, a mark corresponding to the note having the C-chord as a root is displayed on the display section 40 as shown on the upper keyboard.

In a state of root, when the switch 73 is turned on, the first inversion is performed and then Mi becomes a new root. A mark shown in the upper keyboard disappears and instead the mid keyboard is displayed on the display section 40.

In a state of the first inversion, when the switch 73 is turned on, the second inversion is performed, and then the mark shown in the mid keyboard disappears, and the lower display appears newly on the display section 40.

Meanwhile, in a state that the music teacher mode shown in FIG. 3 is displayed, after the switch is turned on, when the beginner level is selected, the music with many notes of slower tempo and same length thereof is selected. When the mid- or advanced level is selected, the music with much variation of its pitch and length is selected.

In addition, in a state the music teacher mode shown in FIG. 3 is displayed, when the switch SW6 is pushed twice, the "melody+chord" function is selected. It become available concurrently to do practice of the chord and melody.

As described above, the present invention enables the user to do practice of melody, rhythm, chord of the electronic musical instrument, seeing the score and keyboards, which are displayed on the display section, thereby providing the user with the effective and correct practice performance of the electronic musical instrument.

What is claimed is:

1. An apparatus for practicing playing an electronic musical instrument, the apparatus comprising:

a keyboard section including a plurality of keys;

a select section for selecting a music teacher mode and a plurality of practice menus therein;

a microcomputer for controlling both a display section and an output section according to the select section and an output section according to a pushed key of the keyboard;

a display section for displaying a predetermined display according to a control signal of the microcomputer; and an output section for outputting an audible sound according to a control signal of the microcomputer.

2. The apparatus of claim 1, wherein said select section selects a level of music to be played, in a state that a menu of music teacher mode is displayed on the display section.

3. The apparatus of claim 2, wherein said select section selects a music name according to a level of the selected music.

4. The apparatus of claim 3, wherein said select section selects a plurality of test menus in the selected music.

5. The apparatus of claim 4, wherein said select section selects one among test menus such as note, rhythm, note+rhythm and one among test menus such as melody, chord, melody+chord.

6. The apparatus of claim 5, wherein said test menus include displays of score and keyboard, which are displayed on the display section.

7. The apparatus of claim 5, wherein said select section selects a test menu of the chord and changes a chord route, a chord type, a chord inversion of the selected chord.

8. A controlled method for practicing playing an electronic musical instrument, comprising the steps of:

determining whether or not a music teacher mode has been selected according to an operation of a select section;

selectively performing gate-on by determining whether or not a key of keyboard has been pushed when it has been determined that the music teacher mode has not been selected;

selectively performing gate-off by determining whether or not the key has been released;

selecting a predetermined menu from a plurality of menus in the music teacher mode after a menu of the music teacher mode is displayed on a display section, when the music teacher mode has been selected;

determining whether or not a practice mode has been selected according to a selection of a predetermined menu; and determining whether or not a key of the keyboard has been released, when the practice mode has been selected, the music teacher routine is being performed and then the practice mode is not selected.

9. The method of claim 8, wherein said music teacher routine comprising the steps of:

judging whether or not a note test is selected;

performing a rhythm practice routine when a note test is not selected;

judging whether or not a key of the keyboard, when a note test is selected, is pushed after a note test is displayed on the display section;

performing a gate-on when a key of the keyboard is pushed;

judging whether or not a pitch of key of the keyboard is identical to a pitch of note of the key indicated on the display section;

judging whether or not a moved cursor, when pitches of notes are identical each other, is placed at end of the score displayed on the display section;

displaying a performance score of pushed keys on the display section, when the cursor is placed at the end of the score; and displaying errors on the display section when pitches of notes are not identical, each other.

10. The method of claim 9, wherein said rhythm practice routine comprising the steps of:

judging whether or not a key of the keyboard is pushed;

judging whether or not a time of pressing a key of the keyboard is identical to a time of the display section when a key of the keyboard is pushed;

moving a cursor of the display section when the time is not identical and displaying an error on the display section and performing an gate-on when the time is not identical, each other; and displaying a performance score on pushed keys when the cursor is placed at end of the score.

11. The method of claim 8, wherein said select section is activated, comprising the steps of:

determining whether or not a chord is inputted through a key of the keyboard after a chord test is displayed on the display section, when a chord test is selected;

displaying the chord after signal indicating coincidence or inconsistency of the chords by judging whether or not the chord inputted in identical to a chord indicated on the display section; and performing a routine corresponding to the selected menu when a predetermined menu is selected.

* * * * *